US010263736B2

(12) United States Patent
Kang et al.

(10) Patent No.: US 10,263,736 B2
(45) Date of Patent: Apr. 16, 2019

(54) METHOD AND DEVICE FOR DETECTING DATA TRANSMISSION AND RECEIVED SIGNALS

(71) Applicant: China Academy of Telecommunications Technology, Beijing (CN)

(72) Inventors: Shaoli Kang, Beijing (CN); Bin Ren, Beijing (CN); Hao Liu, Beijing (CN); Yang Song, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 15/562,895

(22) PCT Filed: Mar. 22, 2016

(86) PCT No.: PCT/CN2016/076984
§ 371 (c)(1),
(2) Date: Sep. 29, 2017

(87) PCT Pub. No.: WO2016/161893
PCT Pub. Date: Oct. 13, 2016

(65) Prior Publication Data
US 2018/0083746 A1    Mar. 22, 2018

(30) Foreign Application Priority Data
Apr. 7, 2015  (CN) .......................... 2015 1 0161138

(51) Int. Cl.
*H04L 5/00* (2006.01)
*H04L 27/04* (2006.01)
*H04L 27/20* (2006.01)

(52) U.S. Cl.
CPC .......... *H04L 5/0007* (2013.01); *H04L 5/0005* (2013.01); *H04L 27/04* (2013.01); *H04L 27/20* (2013.01)

(58) Field of Classification Search
CPC ..... H04L 5/0007; H04L 5/0005; H04L 27/20; H04L 27/04
See application file for complete search history.

(56) References Cited

U.S. PATENT DOCUMENTS 7,062,700 B2    6/2006  Shen et al.
2002/0097810 A1*  7/2002  Seki ..................... H04L 27/3809
375/295

(Continued)

FOREIGN PATENT DOCUMENTS

CN          1677892 A    10/2005
CN        101494629 A     7/2009

(Continued)

OTHER PUBLICATIONS

Rui Zhao et al: "A joint detection based on the OS evidence theory for multi-user superposition modulation", 2014 4th IEEE International Conference on Network Infrastructure and Digital Content, IEEE, Sep. 19, 2014, 4 pages.

(Continued)

*Primary Examiner* — Syed Haider
(74) *Attorney, Agent, or Firm* — Kilpatrick Townsend & Stockton LLP

(57) ABSTRACT

A method and device for data transmission and detecting received signals are provided. The transmitting end adjusts each of a plurality of layers of data modulation symbols on each of time-frequency resources modulated by an initial modulation constellation diagram, according to a modulation constellation rotating factor corresponding to each of layers of data modulation symbols on each of the time-frequency resources; and the transmitting end transmits the plurality of layers of adjusted data modulation symbols superposed on each of time-frequency resources.

13 Claims, 9 Drawing Sheets

(56) References Cited

U.S. PATENT DOCUMENTS

| | | | |
|---|---|---|---|
| 2002/0159427 A1 | 10/2002 | Cleveland | |
| 2005/0105631 A1* | 5/2005 | Giannakis | H04B 7/0669 375/267 |
| 2007/0268977 A1 | 11/2007 | Wang et al. | |
| 2010/0284491 A1* | 11/2010 | Chen | H04L 1/1893 375/308 |
| 2016/0380659 A1* | 12/2016 | Cai | H04J 11/005 455/63.1 |

FOREIGN PATENT DOCUMENTS

| | | | |
|---|---|---|---|
| CN | 102833043 A | * | 12/2012 |
| EP | 1094614 A2 | | 4/2001 |

OTHER PUBLICATIONS

Taherzadeh Mahmoud et al: "SCMA Codebook Design", 2014 IEEE 80th Vehicular Technology Conference (VTC2014-FALL), IEEE, Sep. 14, 2014, 6 pages.

\* cited by examiner $$\begin{bmatrix} \exp\left\{j\dfrac{0\pi}{6}\right\} & \exp\left\{j\dfrac{1\pi}{6}\right\} & 0 & \exp\left\{j\dfrac{2\pi}{6}\right\} & 0 & 0 \\ \exp\left\{j\dfrac{0\pi}{6}\right\} & 0 & \exp\left\{j\dfrac{1\pi}{6}\right\} & 0 & \exp\left\{j\dfrac{2\pi}{6}\right\} & 0 \\ 0 & \exp\left\{j\dfrac{0\pi}{6}\right\} & \exp\left\{j\dfrac{1\pi}{6}\right\} & 0 & 0 & \exp\left\{j\dfrac{2\pi}{6}\right\} \end{bmatrix}$$

FIG. 2D

$$\begin{bmatrix} \exp\left\{j\dfrac{0\pi}{4}\right\} & \exp\left\{j\dfrac{1\pi}{4}\right\} & 0 & \exp\left\{j\dfrac{0\pi}{4}\right\} & 0 & 0 \\ \exp\left\{j\dfrac{0\pi}{4}\right\} & 0 & \exp\left\{j\dfrac{1\pi}{4}\right\} & 0 & \exp\left\{j\dfrac{0\pi}{4}\right\} & 0 \\ 0 & \exp\left\{j\dfrac{0\pi}{4}\right\} & \exp\left\{j\dfrac{1\pi}{4}\right\} & 0 & 0 & \exp\left\{j\dfrac{0\pi}{4}\right\} \end{bmatrix}$$

FIG. 2E

$$H_{PDMA}^{(2,3)} = \begin{bmatrix} 1 & 1 & 0 \\ 1 & 0 & 1 \end{bmatrix}$$ ☐ Mapping column of user equipment 1

⌇⌇ Mapping column of user equipment 2

FIG. 2F

$$\left[\begin{matrix}\exp\left\{j\dfrac{0\pi}{4}\right\}\\ \exp\left\{j\dfrac{0\pi}{4}\right\}\end{matrix}\right.\left.\begin{matrix}\exp\left\{j\dfrac{1\pi}{4}\right\} & 0\\ 0 & \exp\left\{j\dfrac{1\pi}{4}\right\}\end{matrix}\right]$$

FIG. 2G

$$\left[\begin{matrix}\exp\left\{j\dfrac{0\pi}{4}\right\}\\ \exp\left\{j\dfrac{0\pi}{4}\right\}\end{matrix}\right.\left.\begin{matrix}\exp\left\{j\dfrac{0\pi}{4}\right\} & 0\\ 0 & \exp\left\{j\dfrac{0\pi}{4}\right\}\end{matrix}\right]$$

FIG. 2H

$$H_{PDMA}^{(2,3)} = \begin{bmatrix} 1 & 1 & 0 \\ 1 & 0 & 1 \end{bmatrix}$$

□ Mapping column of user equipment 1

⬚ Mapping column of user equipment 2

□ Mapping column of user equipment 3

FIG. 2I

$$\begin{bmatrix} h_{k,1}\exp\left\{j\dfrac{0\pi}{6}\right\} & h_{k,1}\exp\left\{j\dfrac{1\pi}{6}\right\} & 0 & h_{k,1}\exp\left\{j\dfrac{2\pi}{6}\right\} & 0 & 0 \\ h_{k,2}\exp\left\{j\dfrac{0\pi}{6}\right\} & 0 & h_{k,2}\exp\left\{j\dfrac{1\pi}{6}\right\} & 0 & h_{k,2}\exp\left\{j\dfrac{2\pi}{6}\right\} & 0 \\ 0 & h_{k,3}\exp\left\{j\dfrac{0\pi}{6}\right\} & h_{k,3}\exp\left\{j\dfrac{1\pi}{6}\right\} & 0 & 0 & h_{k,3}\exp\left\{j\dfrac{2\pi}{6}\right\} \end{bmatrix}$$

FIG. 5A $$\begin{bmatrix} h_{1,1}\exp\left\{j\dfrac{0\pi}{6}\right\} & h_{1,1}\exp\left\{j\dfrac{1\pi}{6}\right\} & 0 & h_{2,1}\exp\left\{j\dfrac{0\pi}{6}\right\} & 0 & 0 \\ h_{1,2}\exp\left\{j\dfrac{0\pi}{6}\right\} & 0 & h_{1,2}\exp\left\{j\dfrac{1\pi}{6}\right\} & 0 & h_{2,2}\exp\left\{j\dfrac{0\pi}{6}\right\} & 0 \\ 0 & h_{1,3}\exp\left\{j\dfrac{0\pi}{6}\right\} & h_{1,3}\exp\left\{j\dfrac{1\pi}{6}\right\} & 0 & 0 & h_{2,3}\exp\left\{j\dfrac{0\pi}{6}\right\} \end{bmatrix}$$

FIG. 5B

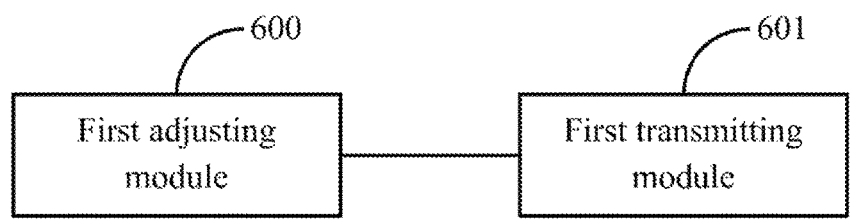

FIG. 6

METHOD AND DEVICE FOR DETECTING DATA TRANSMISSION AND RECEIVED SIGNALS

CROSS REFERENCE TO RELATED APPLICATION

The present application is a US National Stage of International Application No. PCT/CN2016/076984, filed on Mar. 22, 2016, designating the United States, and claiming the priority of the Chinese patent application No. 201510161138.4, filed with the Chinese Patent Office on Apr. 7, 2015 and entitled "Methods and Devices for Data Transmission and Detecting Received Signals", which is incorporated herein by reference in its entirety.

The present application claims the priority of the Chinese patent application No. 201510161138.4, filed with the Chinese Patent Office on Apr. 7, 2015 and entitled "Methods and Devices for Data Transmission and Detecting Received Signals", which is incorporated herein by reference in its entirety.

FIELD

The present invention relates to the technical field of wireless communications, and in particular to methods and devices for data transmission and detecting received signal.

BACKGROUND

The Orthogonal Frequency Division Multiple Access (OFDMA) technology adopted in the traditional Long Term Evolution (LTE) system is designed based on a basic idea of orthogonal transmission, wherein the transmitting and receiving are simple and easy to realize, and the performance can also be ensured. However, along with the rapid development of the applications of the services of mobile internet and internet of things, owing to its greater advantages in improving system capacity, reducing time delay and supporting more user equipments, the non-orthogonal multiple access (NOMA) technology is more likely to be adopted in a 5G mobile communication system. In the NOMA technology, information of different user equipments are superposed on a same transmission resource for transmission, thereby artificially introducing interference which needs to be eliminated through a more complex receiver algorithm at a receiving end. At present, some typical NOMA technologies mainly include the Non-Orthogonal Multiple Access (NOMA), the Sparse Code Multiple Access (SCMA), and the Pattern Division Multiple Access (PDMA), etc.

By adopting the NOMA technology, signals of multiple user equipments can be superposed at a power domain, and a successive interference cancellation receiver is adopted at a receiving end. SCMA is a novel frequency domain non-orthogonal multiple access technology, wherein different data streams are mapped onto different code words of a multidimensional codebook, each code word represents an extensible transport layer, and all the SCMA transport layers share the same time-frequency resource. A receiving end can decode by adopting an iterative message passing algorithm (MPA) and utilizing the sparsity feature of code words, with the performance approximating the performance obtained through optimal detection. In the PDMA technology, by utilizing a pattern division technology and based on the non-orthogonal feature patterns of multiple signal domains including power domain, code domain and space domain of the user equipment signals, user equipments are distinguished at the transmitting end. At the receiving end, based on a characteristic structure of a pattern of the user equipment, multi-user equipment detection is realized by adopting a successive interference cancellation method, which can approximate a capacity bound of a multiple access channel.

In the existing PDMA technology, an encoding matrix can be used as a basic mapping pattern to distinguish multiple user equipments. Generally, a row of an encoding matrix corresponds to a group of frequency resources participating in data mapping multiplexed by multiple user equipments, and a column represents a pattern mapping manner of a multi-user equipment data. For example, each column of an encoding matrix is used by a user equipment, while the maximum number of multi-user equipments supported by PDMA is the total number of columns of an encoding matrix. Alternatively, multiple columns of an encoding matrix can also be used by a same user equipment.

If each column of an encoding matrix of PDMA corresponds to a layer of data stream, when multiple layers of data streams (data of a same user equipment or data of different user equipments) reach the receiving end (a base station in uplink or a user equipment in downlink) via a same channel, multiple layers of data streams use the same modulation constellation and the same power at present, which is disadvantageous for signal detection (e.g., using a Belief Propagation (BP) algorithm) at the receiving end due to the fact that corresponding modulation constellation diagrams are superposed when multiple layers of data modulation symbols reach the receiving end via a same channel.

In conclusion, each column of an encoding matrix of PDMA corresponds to a layer of data stream, and multiple data streams use the same modulation constellation and the same power, which is disadvantageous for signal detection at the receiving end due to the fact that corresponding modulation constellation diagrams are superposed when multiple layers of data modulation symbols reach the receiving end via a same channel.

SUMMARY

The embodiments of the present invention provide methods and devices for data transmission and detecting received signals, to address the problem existing in the prior art that the receiving end cannot effectively detect signals due to the fact that corresponding modulation constellation diagrams are superposed when the modulation symbols of multiple layers of data streams, which use the same modulation constellation and the same power in the encoding matrix of the PDMA, reach the receiving end after passing through the same channel.

The embodiments of the invention provide a method for data transmission, comprising:

adjusting, by a transmitting end, each of a plurality of layers of data modulation symbols on each of a plurality of time-frequency resources modulated by an initial modulation constellation diagram, according to a modulation constellation rotating factor corresponding to each of the plurality of layers of data modulation symbols on each of the time-frequency resources, wherein the plurality of time-frequency resources are a plurality of time-frequency resources onto which data are mapped according to an encoding matrix; and transmitting, by the transmitting end, the plurality of layers of adjusted data modulation symbols superposed on each of time-frequency resource.

Optionally, the method further includes:

adjusting, by the transmitting end, power of each of the plurality of layers of data modulation symbols on each of the time-frequency resources;

after the transmitting end adjusts each of the plurality of layers of modulation symbols on each of time-frequency resources and before the transmitting end transmits the plurality of layers of adjusted data modulation symbols superposed on each of time-frequency resources, the method further comprises:

adjusting, by the transmitting end, an amplitude of each of the plurality of layers of data modulation symbols on each of the time-frequency resources, according to the power of each of the plurality of layers of data modulation symbols on each of the time-frequency resources.

Optionally, the transmitting end determines the modulation constellation rotating factor by the following manner:

the transmitting end determines the number of data layers which need to pass through a same channel and which need to be subjected to modulation constellation rotation in each row according to the number of non-zero elements in column elements, corresponding to data layers which needs to pass through the same channel, in each row of the encoding matrix; wherein each row of the encoding matrix corresponds to one mapped time-frequency resource, and each column of the encoding matrix corresponds to one data layer, when one column element in a row is non zero, it represents that the data modulation symbol of the data layer corresponding to the column is mapped onto the time-frequency resource corresponding to the row, and when one column element in a row is zero, it represents that no data modulation symbol of the data layer corresponding to the column is mapped onto the time-frequency resource corresponding to the row;

the transmitting end determines the modulation constellation rotating factor of each of the data layers needing to be subjected to modulation constellation rotation according to the number of the data layers which need to pass through the same channel and which need to be subjected to modulation constellation rotation in each row; and adjusting, by the transmitting end, each of the plurality of layers of data modulation symbols on each of time-frequency resources, according to the modulation constellation rotating factor corresponding to each of the plurality of layers of data modulation symbols in each row, includes:

the transmitting end determines a precoding factor according to the modulation constellation rotating factor of each of the data layers which need to pass through the same channel and which need to be subjected to modulation constellation rotation in each row, and performs a precoding process on each of the plurality of layers of data modulation symbols on each of the time-frequency resources according to the precoding factor.

Optionally, the transmitting end determines the modulation constellation rotating factor of each of the data layers which need to pass through the same channel and which need to be subjected to modulation constellation rotation in each row according to the following formula:

$$\text{the modulation constellation rotating factor} = \exp\left\{j\frac{n\pi}{mN}\right\};$$

wherein $\exp\{x\}$ is an exponential function which takes a natural constant e as a radix; j is an imaginary unit; n=0, 1 . . . N−1; N is the number of data layers which need to pass through the same channel and which need to be subjected to modulation constellation rotation; and m is a parameter related to the modulation constellation.

Optionally, after the transmitting end adjusts a modulation constellation phase of each of the plurality of layers of data modulation symbols on each of the time-frequency resources, the method further includes:

the transmitting end transmits the modulation constellation rotating factor to a receiving end.

Optionally, after the transmitting end adjusts a modulation constellation phase of each of the plurality of layers of data modulation symbols on each of the time-frequency resources, the method further includes:

the transmitting end transmits adjustment information of transmit power to a receiving end.

The embodiments of the invention provide a method for detecting a received signal, and the method includes:

updating, by a receiving end, an estimated channel on each of a plurality of time-frequency resources according to a modulation constellation rotating factor corresponding to each of a plurality of layers of data modulation symbols on each of the time-frequency resources to obtain an updated channel, wherein the modulation constellation rotating factor is a modulation constellation rotating factor which is adopted in adjustment of a modulation constellation phase when a transmitting end transmits the data modulation symbols, and the time-frequency resources are time-frequency resources onto which data are mapped according to an encoding matrix; and detecting, by the receiving end, a received signal according to the updated channel, and detecting data of a plurality of layers of data streams from the received signal.

Optionally, updating, by the receiving end, the estimated channel on each of the time-frequency resources according to the modulation constellation rotating factor corresponding to each of the plurality of layers of data modulation symbols on each of the time-frequency resources further includes:

updating, by the receiving end, the estimated channel on each of the time-frequency resources according to the modulation constellation rotating factor and modulation symbol power information to obtain the updated channel, wherein the modulation symbol power information corresponds to a power adjusted by the transmitting end when the transmitting end transmits the data modulation symbols.

The embodiments of the invention provide a transmitting device for data transmission, includes:

a first adjustment module, configured for adjusting each of a plurality of data modulation symbols on each of a plurality of time-frequency resources modulated by an initial modulation constellation diagram according to a modulation constellation rotating factor corresponding to each of the plurality of layers of data modulation symbols on each of the time-frequency resources, wherein the plurality of time-frequency resources are a plurality of time-frequency resources onto which data are mapped according to an encoding matrix; and a first transmitting module, configured for transmitting the plurality of layers of adjusted data modulation symbols superposed on each of the time-frequency resources.

Optionally, the first adjustment module is further configured for:

adjusting power of each of the plurality of layers of data modulation symbols on each of the time-frequency resources, and adjusting an amplitude of each of the plurality of layers of data modulation symbols on each of the time-frequency resources, according to the power of each of the plurality of layers of data modulation symbols on each of the time-frequency resources.

Optionally, the first adjustment module is further configured for determining the modulation constellation rotating factor by the following manner:

determining the number of data layers which need to pass through a same channel and which need to be subjected to modulation constellation rotation in each row according to the number of non-zero elements in the column elements corresponding to the data layers which need to pass through the same channel in a row of the encoding matrix; wherein each row of the encoding matrix corresponds to one mapped time-frequency resource, and each column of the encoding matrix corresponds to one data layer, when one column element in a row is non zero, it represents that the data modulation symbol of the data layer corresponding to the column is mapped onto the time-frequency resource corresponding to the row, and when one column element in a row is zero, it represents that no data modulation symbol of the data layer corresponding to the column is mapped onto the time-frequency resource corresponding to the row;

the first adjustment module is configured for:

determining a precoding factor according to the modulation constellation rotating factor of each of the data layers which need to pass through the same channel and which need to be subjected to modulation constellation rotation in each row, and performing a precoding process on each of the plurality of layers of data modulation symbols on each of the time-frequency resources according to the precoding factor.

Optionally, the first adjustment module is configured for determining the modulation constellation rotating factor of each of the data layers which need to pass through the same channel and which need to be subjected to modulation constellation rotation in each row according to the following formula:

$$\text{the modulation constellation rotating factor} = \exp\left\{j\frac{n\pi}{mN}\right\};$$

wherein exp{x} is an exponential function which takes a natural constant e as a radix; j is an imaginary unit; n=0, 1 . . . N−1; N is the number of data layers which need to pass through the same channel and which need to be subjected to modulation constellation rotation; and m is a parameter related to the modulation constellation.

Optionally, the first transmitting module is further configured for:

transmitting the modulation constellation rotating factor to a receiving end.

Optionally, the first transmitting module is further configured for:

transmitting adjustment information of transmit power to a receiving end.

The embodiments of the invention provide a receiving device for signal detection, which includes:

a first processing module, configured for updating an estimated channel on each of a plurality of time-frequency resources according to a modulation constellation rotating factor corresponding to each of a plurality of layers of data modulation symbols on each of the time-frequency resources to obtain an updated channel, wherein the modulation constellation rotating factor is a modulation constellation rotating factor which is adopted in adjustment of a modulation constellation phase when transmitting end transmits the data modulation symbols, and the time-frequency resources are time-frequency resources onto which data are mapped according to an encoding matrix; and a first receiving module, configured for detecting a received signal according to the updated channel, and detecting data of a plurality of layers of data streams from the received signal.

Optionally, the first processing module is further configured for:

updating the estimated channel on each of the time-frequency resources according to the modulation constellation rotating factor and modulation symbol power information to obtain the updated channel, wherein the modulation symbol power information corresponds to a power adjusted by the transmitting end when the transmitting end transmits the data modulation symbols.

The embodiments of the invention provide a transmitting device, comprising:

a processor, configured for reading programs in a memory to perform:

adjusting each of a plurality of data modulation symbols on each of a plurality of time-frequency resources modulated by an initial modulation constellation diagram according to a modulation constellation rotating factor corresponding to each of the plurality of layers of data modulation symbols on each of the time-frequency resources, wherein the plurality of time-frequency resources are a plurality of time-frequency resources onto which data are mapped according to an encoding matrix; and transmitting the plurality of layers of adjusted data modulation symbols superposed on each of the time-frequency resources through a transceiver;

the transceiver, configured for receiving and transmitting data under the control of a processor.

Optionally, the processor is further configured for:

adjusting power of each of the plurality of layers of data modulation symbols on each of the time-frequency resources, and adjusting an amplitude of each of the plurality of layers of data modulation symbols on each of the time-frequency resources according to the power of each of the plurality of layers of data modulation symbols on each of the time-frequency resources.

Optionally, the processor is further configured for determining the modulation constellation rotating factor by the following manner:

determining the number of data layers which need to pass through a same channel and which need to be subjected to modulation constellation rotation in each row according to the number of non-zero elements in column elements corresponding to the data layers which need to pass through the same channel in each row of the encoding matrix; wherein each row of the encoding matrix corresponds to one mapped time-frequency resource, and each column of the encoding matrix corresponds to one data layer, when one column element in a row is non zero, it represents that the data modulation symbol of the data layer corresponding to the column is mapped onto the time-frequency resource corresponding to the row, and when one column element in a row is zero, it represents that no data modulation symbol of the data layer corresponding to the column is mapped onto the time-frequency resource corresponding to the row;

the processor is configured for:

determining a precoding factor according to the modulation constellation rotating factor of each of the data layers which need to pass through the same channel and which need to be subjected to modulation constellation rotation in each row, and performing a precoding process on each of the plurality of layers of data modulation symbols on each of the time-frequency resources according to the precoding factor.

Optionally, the processor is configured for determining the modulation constellation rotating factor of each of the data layers which need to pass through the same channel and which need to be subjected to modulation constellation rotation in each row according to the following formula:

$$\text{the modulation constellation rotating factor} = \exp\left\{j\frac{n\pi}{mN}\right\};$$

wherein exp{x} is an exponential function which takes a natural constant e as a radix; j is an imaginary unit; n=0, 1 ... N−1; N is the number of data layers which need to pass through the same channel and which need to be subjected to modulation constellation rotation; and m is a parameter related to the modulation constellation.

Optionally, the processor is further configured for:
transmitting the modulation constellation rotating factor to the receiving end through a transceiver.

Optionally, the processor is further configured for:
transmitting adjustment information of transmit power to the receiving end through a transceiver.

The embodiments of the invention provide a receiving device, comprising:

a processor, configured for reading the programs in a memory to perform:

updating an estimated channel on each of a plurality of time-frequency resources according to a modulation constellation rotating factor corresponding to each of a plurality of layers of data modulation symbols on each of the time-frequency resources to obtain an updated channel, wherein the modulation constellation rotating factor is a modulation constellation rotating factor which is adopted in adjustment of a modulation constellation phase when transmitting end transmits the data modulation symbols, and the time-frequency resources are time-frequency resources onto which data are mapped according to an encoding matrix; controlling a transceiver to detect a received signal through the updated channel, and detecting data of a plurality of layers of data streams from the received signal;

the transceiver, configured for receiving and transmitting data under the control of the processor.

Optionally, the processor updates the estimated channel on each of the time-frequency resources according to the modulation constellation rotating factor and modulation symbol power information to obtain the updated channel, wherein the modulation symbol power information corresponds to a power adjusted by the transmitting end when the transmitting end transmits the data modulation symbols.

In the embodiments of the invention, each layer of data modulation symbols modulated by an initial modulation constellation diagram is adjusted according to the modulation constellation rotating factor corresponding to each layer of data modulation symbols, so that the modulation constellation diagrams corresponding to various layers of data modulation symbols are non-overlapping, so as to avoid the situation that the receiving end cannot effectively detect signals due to the fact that corresponding modulation constellation diagrams are overlapping when the modulation symbols of multiple layers of data streams using the same modulation constellation and the same power in the encoding matrix of the PDMA reach the receiving end after passing through the same channel; and the system performance is further improved.

BRIEF DESCRIPTION OF THE DRAWINGS

FIG. 2A and FIG. 2B are schematic diagrams illustrating modulation phase rotation of Quadrature Phase Shift Keying (QPSK) in accordance with Embodiment 2 of the invention; FIGS. 2C, 2F, and 2I illustrate encoding matrix in Examples 1, 2 and 3 respectively; FIGS. 2D, 2E, 2G, 2H, 2J, 2K illustrate the modulation constellation rotating factor matrix in the Examples 1, 2, and 3 of the invention;

FIG. 5A and FIG. 5B illustrates the phase rotation of the channel in the downlink transmission and uplink transmission;

FIG. 6 is a schematic structural diagram of a transmitting device in accordance with Embodiment 6 of the invention;

DETAILED DESCRIPTION OF THE EMBODIMENTS

Figure 1:
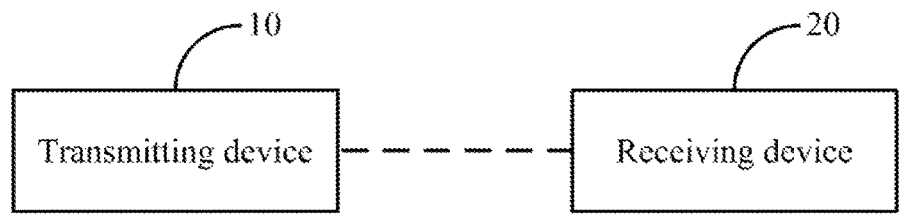
FIG. 1 is a schematic structural diagram of a system for data transmission in accordance with Embodiment 1 of the invention.

In the embodiments of the present invention, each of multiple layers of data modulation symbols on each of multiple time-frequency resources modulated by an initial modulation constellation diagram is adjusted according to the modulation constellation rotating factor corresponding to each layer of data modulation symbols on each time-frequency resource, wherein the multiple time-frequency resources are the multiple time-frequency resources on to which data is mapped according to the encoding matrix, thereby avoiding the problem that the receiving end cannot effectively detect signals due to the fact that corresponding modulation constellation diagrams are overlapping when the modulation symbols of multiple layers of data streams using the same modulation constellation and the same power in the encoding matrix of PDMA pass through the same channel to reach the receiving end; and the system performance is further improved.

In the embodiments of the invention, when determining that the number of users multiplexed on multiple time-frequency resources for transmission are fewer, the data of a user equipment can be mapped to multiple columns (multiple data layers) of the encoding matrix, thereby improving transmission load of the user equipment and improving the overall throughput of the system; on the other hand, when a certain spectral efficiency is ensured, the level of modulation encoding can be lowered, thereby further reducing the algorithm complexity of the receiver.

The above content introduces that in the embodiments of the invention, multiple layers of data streams on multiple time-frequency resources corresponding to the encoding matrix reach the receiving end through the same channel, then how to transmission will be described below.

In the embodiments of the invention, the multiple layers of data streams passing through the same channel occurs in the following two conditions.

Downlink transmission: all the data layers for multiple user equipments pass through the same channel from a base station and reach any user equipment.

Uplink transmission: the data of a user equipment which is mapped to multiple layers pass through the same channel and reach the base station.

In the embodiments of the invention, when multiple layers of data streams on multiple time-frequency resources corresponding to an encoding matrix pass through the same channel, data modulation constellations are non-overlapping by adjusting the constellation phase, thereby being beneficial for improving the detection accuracy of the receiving end.

When in downlink transmission, the transmitting end is a base station; the receiving end is a user equipment.

When in uplink transmission, the transmitting end is a user equipment; the receiving end is a base station.

Two schemes are available when process is performed based on the modulation constellation rotating factor corresponding to the various layers of data modulation symbols in the embodiments of the invention.

Scheme 1: the data is firstly modulated by an initial modulation constellation diagram, and then various layers of data modulation symbols obtained by modulating of an initial modulation constellation diagram are adjusted based on the modulation constellation rotating factor.

The embodiments of the invention will be described in detail below in combination with the accompanying drawings of the description. For scheme 1, please refer to FIG. 1 to FIG. 11.

As shown in FIG. 1, a data transmission system in accordance with Embodiment 1 of the invention includes a transmitting device 10 and a receiving device 20.

The transmitting device 10 is configured for adjusting each of multiple layers of data modulation symbols on each of multiple time-frequency resources modulated by an initial modulation constellation diagram according to the modulation constellation rotating factor corresponding to the each layer of data modulation symbols on each time-frequency resource, wherein the multiple time-frequency resources are the multiple time-frequency resources onto which multiple layers of data are mapped according to the matrix encoding, and transmitting the adjusted multiple layers of data modulation symbols superposed on each time-frequency resource.

The receiving device 20 is configured for updating an estimated channel on each time-frequency resource according to the modulation constellation rotating factor corresponding to each layer of data modulation symbols on each time-frequency resource to obtain an updated channel, wherein the modulation constellation rotating factor is a modulation constellation rotating factor which is adopted in the adjustment of a modulation constellation phase when the transmitting end transmits the data modulation symbols, and the time-frequency resource is the time-frequency resource onto which the data is mapped according to the encoding matrix; and the receiving end is also configured for detecting the received signal according to the updated channel, and detecting the data in multiple layers of data streams from the received signal.

Optionally, the transmitting device determines the modulation constellation rotating factor based on the following manner.

According to the number of non-zero elements in column elements, corresponding to the data layers which need to pass through the same channel, in each row of an encoding matrix, the transmitting device determines the number of data layers which need to pass through the same channel and which need to be subjected to modulation constellation rotation in each row; wherein each row of the encoding matrix corresponds to one mapped time-frequency resource, while each column corresponds to a data layer, when one column element in a row is non zero, it represents that the data modulation symbol of the data layer corresponding to the column is mapped onto the time-frequency resource corresponding to the row, and when a column element in a row is zero, it represents that no data modulation symbol of the data layer corresponding to the column is mapped onto the time-frequency resource corresponding to the row.

The transmitting device determines the modulation constellation rotation factor of the data layer which needs to be subjected to modulation constellation rotation according to the number of data layers which need to pass through the same channel and which need to be subjected to modulation constellation rotation in each row.

In the embodiments of the invention, the data layers of different channels are mutually independent, and constellation phase rotation is adopted between the data layers which pass through the same channel to reach the receiving end, then the number of data layers which needs to be subjected to rotation is reduced to the greatest extent, and the distance between the modulation constellation points after rotation can be increased. That is, the number of phase rotation in each row of the encoding matrix is the number of the data layers needing to be subjected to phase rotation (namely, the row weight of corresponding rows in the encoding matrix).

Optionally, the transmitting device determines the rotation factors of data layers needing to be subjected to phase rotation in the channel corresponding to each row based on the following formula:

$$\text{modulation constellation rotating factor} = \exp\left\{j\frac{n\pi}{mN}\right\}.$$

Where exp {x} is an exponential function which takes the natural constant e as a radix; j is an imaginary unit; n=0, 1 . . . N−1; N is the number of data layers which need to pass through the same channel and which need to be subjected to modulation constellation rotation; and m is a parameter related to the modulation constellation.

Figure 2A:
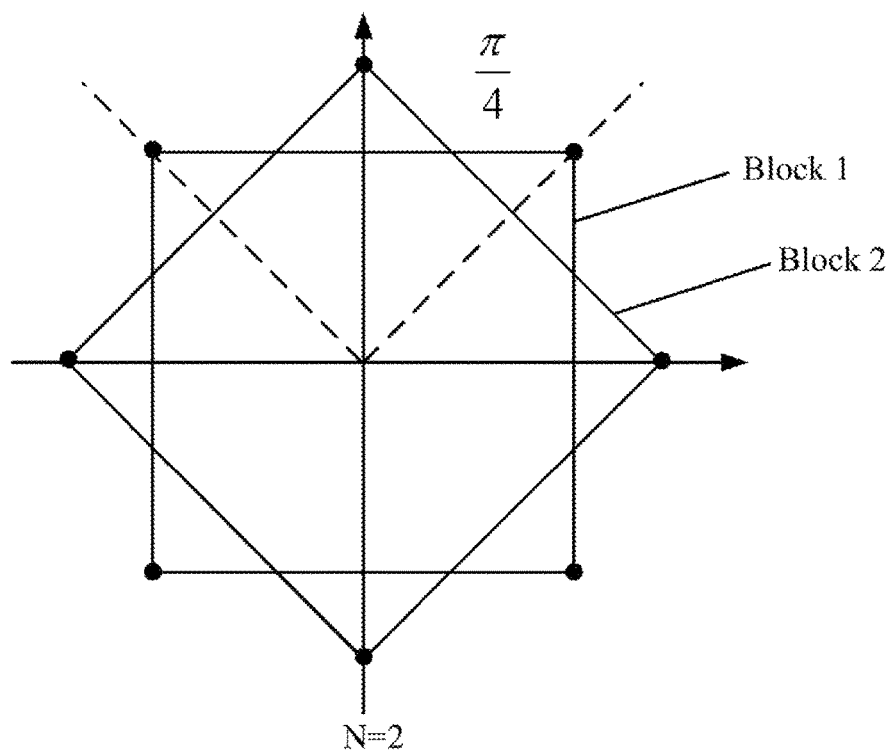

For different rotation factors, the rotation angles are also different. As shown in FIG. 2A, in the modulation constellation diagram of the phase rotation N=2 under the modulation of QPSK, N is equal to 2, n is 0 and 1. The data modulation symbols corresponding to n=0 are actually not rotatable, namely, the modulation constellation diagram corresponding to four vertexes in block 1 in the figure; and the data modulation symbols corresponding to n=1 are rotated to the position of the modulation constellation diagram corresponding to four vertexes in block 2.

Figures 2B, 2C:
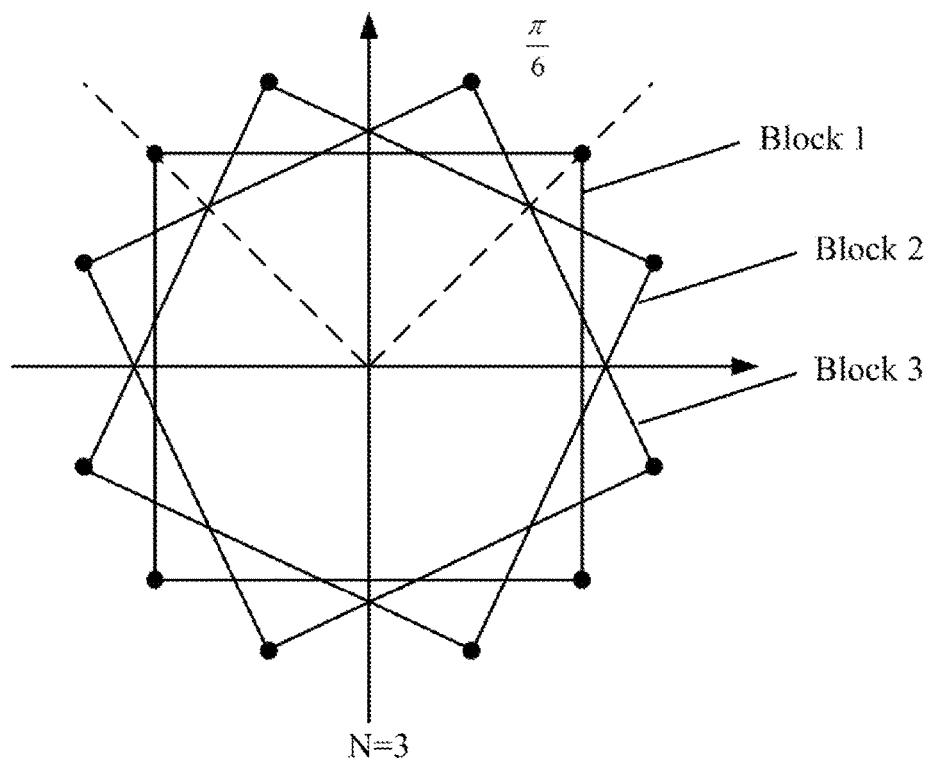

As shown in FIG. 2B, in the modulation constellation diagram of the phase rotation N=3 under the modulation of QPSK, N=3, n is equal to 0, 1 and 2. The data modulation symbols corresponding to n=0, are actually not rotatable, namely, the modulation constellation diagram corresponding to the vertex in block 1 in the figure; the data modulation symbols corresponding to n=1, are rotated to the position of the modulation constellation diagram corresponding to the vertex in block 2; the data modulation symbols corresponding to n=2, are rotated to the modulation constellation diagram corresponding to the vertex in block 3.

Optionally, the step that the transmitting device adjusts each layer of data modulation symbols according to the modulation constellation rotation factor corresponding to each layer of data modulation symbols includes:

the transmitting device determines a precoding factor according to the modulation constellation rotating factor of each of data layers which need to pass through the same channel and which need to be subjected to modulation constellation rotation in each row, and performs precoding process on each layer of data modulation symbols on each time-frequency resource according to the determined precoding factor.

Several examples will be given below.

Example 1, the transmission of two user equipments is realized by using $H_{PDMA}^{(3,7)}$.

The encoding matrix is illustrated in FIG. 2C.

The encoding matrix given in FIG. 2C is assigned to two user equipments, wherein the column in the encoding matrix corresponds to the data layer 1 of the user equipment k, the row corresponds to the frequency-domain logical resource m, namely, columns 1, 2, and 3 correspond to the data layers of user equipment, while the columns 4, 5 and 6 correspond to the data layers of user equipment 2.

During downlink transmission, user equipment 1 and user equipment 2 occupy 6 data layers in total, and they pass through the same channel to reach any user equipment. The row weights of each row corresponding to the six layers of data of the encoding matrix are all 3, namely, the number N of phase rotation is equal to 3, the modulation constellation rotation factor of the k-th (k=1,2) user equipment in the m-th logical resource (m=1,2,3) and the l-th (l=1,2,3) layer is $C_{k,m,l}$, and the modulation constellation rotation factor matrix is illustrated in FIG. 2D.

During uplink transmission, the data of user equipment 1 and user equipment 2 pass through different channels, and phase rotation is only performed in multiple layers of data of one user equipment. The user equipment 1 occupies 3 data layers, the row weight of each row is 2, namely, the number $N_1$ of phase rotation is equal to 2; the user equipment occupies 3 data layers, the row weight of each row is 1, namely, the number $N_2$ of phase rotation is equal to 1, the modulation constellation rotation factor of the k-th user equipment in the m-th logical resource and the l-th layer is $C_{k,m,l}$, and the modulation constellation rotation factor matrix is illustrated in FIG. 2E.

Example 2, the transmission of two user equipments is realized by using $H_{PDMA}^{(2,3)}$.

The encoding matrix is illustrated in FIG. 2F.

The encoding matrix in FIG. 2F is assigned to two user equipments, wherein the first column in the encoding matrix corresponds to the data layer of user equipment 1, while column 2 and column 3 correspond to the data layer of user equipment 2.

During downlink transmission, user equipment 1 and user equipment 2 occupy 3 data layers in total, they pass through the same channel to reach any user equipment, the row weight of each row corresponding to the 3 layers of data of the encoding matrix is 2, namely, the number N of phase rotation is equal to 2, and the modulation constellation rotation factor matrix is illustrated in FIG. 2G.

During uplink transmission, the data of user equipment 1 and the data of user equipment 2 pass through different channels, and phase rotation is only performed on various layers of data in one user equipment. The user equipment 1 occupies one data layer, the row weight of each row is 1, namely, the number $N_1$ of phase rotation is equal to 1; the user equipment 2 occupies two data layers, the row weight of each row is 1, namely, the number $N_2$ of phase rotation is equal to 1, that is, the data of each user equipment does not need to be subjected to phase rotation, therefore, the modulation constellation rotating factor matrix is illustrated in FIG. 2H.

Example 3, the transmission of three user equipments are realized by using $H_{PDMA}^{(2,3)}$.

The encoding matrix is illustrated in FIG. 2I.

The encoding matrix given in the above formula is assigned to three user equipments, wherein column 1 in the encoding matrix corresponds to the data layer of user equipment 1, column 2 corresponds to the data layer of user equipment 2, and column 3 corresponds to the data layer of user equipment 3.

Figure 2J:
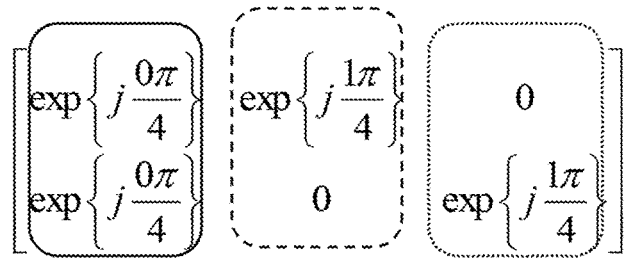

During downlink transmission, user equipment 1, user equipment 2 and user equipment 3 occupy three data layers in total, and they pass through the same channel to reach any user equipment, for the three layers of data of the encoding matrix, the row weight of each row is 2, namely, the number N of phase rotation is equal to 2, and the modulation constellation rotating factor matrix is illustrated in FIG. 2J.

Figure 2K:
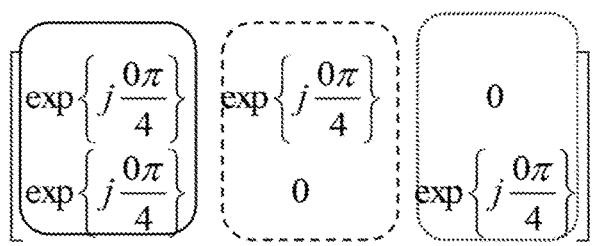

During uplink transmission, the data of user equipment 1, user equipment 2 and user equipment 3 pass through different channels, and phase rotation is only performed on various layers of data in one user equipment. The user equipment 1 occupies one data layer, the row weight of each row is 1, namely, the number $N_1$ of phase rotation is equal to 1; the user equipment 2 occupies one data layer, the row weight of each row is 1, namely, the number $N_2$ of phase rotation is equal to 1; the user equipment 3 occupies one data layer, the row weight of each row is 1, namely, the number $N_3$ of phase rotation is equal to 1, that is, the data of each user equipment does not need to be subjected to phase rotation, therefore, the modulation constellation rotating factor matrix is illustrated in FIG. 2K.

Optionally, in addition to adjusting the constellation phase of various layers of data modulation symbols, the transmitting device can further adjust the power of various layers of data modulation symbols on each time-frequency resource.

Correspondingly, based on the power of various layers of data modulation symbols on each time-frequency resource, the transmitting device adjusts the amplitude of various layers of data modulation symbols on each time-frequency resource.

The receiving device updates an estimated channel on each time-frequency resource according to the information of the modulation constellation rotating factor and power of the modulation symbols to obtain an updated channel, wherein the information of power of modulation symbols corresponds to the power adjusted when the transmitting end transmits the data modulation symbols.

Figure 3:
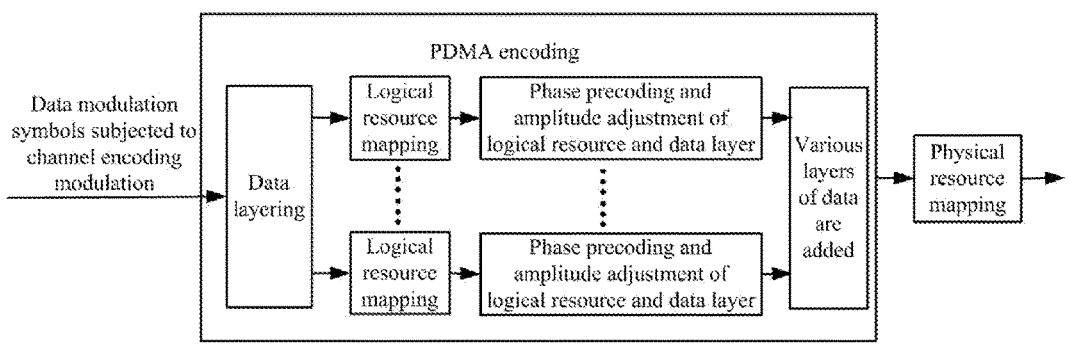
FIG. 3 is a schematic diagram of PDMA encoding of data transmitted by an user equipment in uplink transmission in accordance with Embodiment 3 of the invention.
Figure 4:
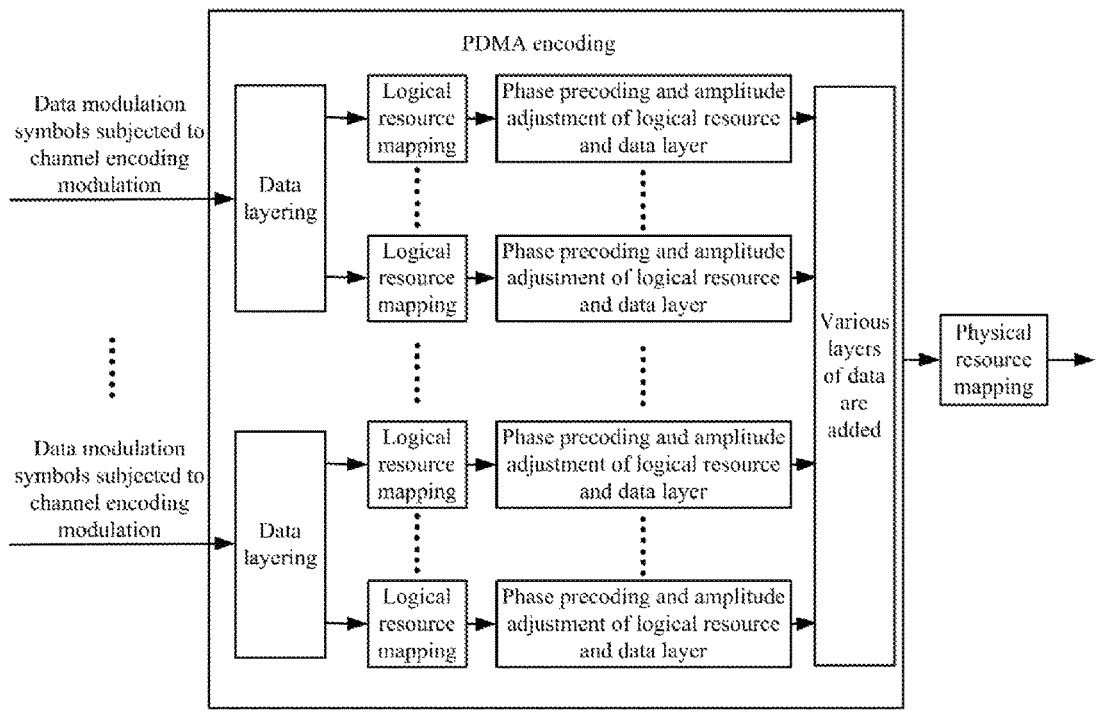
FIG. 4 is a schematic diagram of PDMA encoding of data transmitted for user equipment in downlink transmission in accordance with Embodiment 4 of the invention.

For the implementation process of the solution based on the combination of phase rotation and power adjustment, please refer to FIG. 3 and FIG. 4.

FIG. 3 and FIG. 4 respectively illustrate the PDMA encoding flow of data transmitted by user equipment in the uplink transmission and the PDMA encoding flow of data for multiple user equipments in the downlink transmission.

Figure 5:
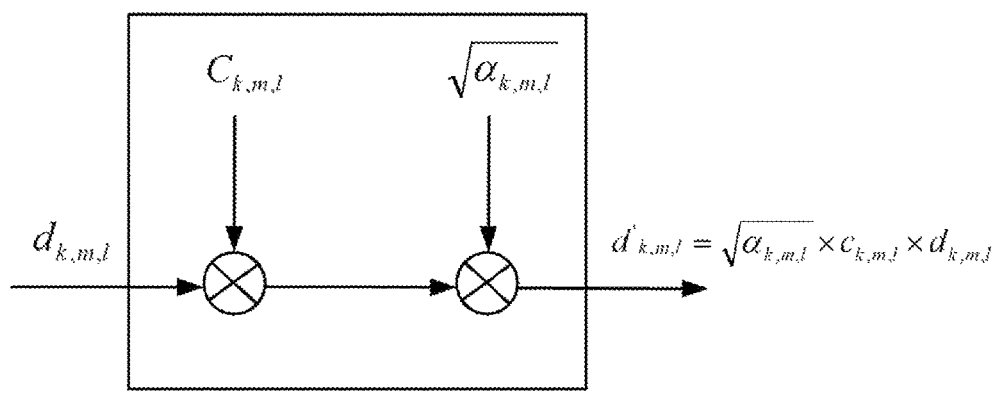
FIG. 5 is a schematic diagram illustrating phase rotation and amplitude adjustment in accordance with Embodiment 5 of the invention.

The data modulation symbols which are subjected to channel encoding modulation are layered according to encoding matrix, and are mapped onto the logical resource; phase pre-encoding and amplitude adjustment are performed on the data modulation symbols (namely, the power distribution among various user equipments and various data layers) according to corresponding logical resource and corresponding data layers; and various layers of data modulation symbols are added together on corresponding logical resource and are mapped onto the physical resource.

Where the logical resource, the phase pre-encoding of the data layer and the amplitude adjustment process are as shown in FIG. 5. In FIG. 5, $d_{k,m,l}$ is the data symbol of the k-th user equipment on the m-th logical resource and the l-th layer, and after processed by the modulation constellation rotation factor $C_{k,m,l}$ and amplitude (power) adjustment factor $\sqrt{\alpha_{k,m,l}}$, the output data is $d'_{k,m,l} = \sqrt{\alpha_{k,m,l}} \times c_{k,m,l} \times d_{k,m,l}$.

A transmitter notifies the receiver of the information of phase rotation and power distribution information via signaling, or the receiving and transmitting parties have both known the information of phase rotation and power distribution. The receiver performs channel estimation by using a pilot signal (such as DMRS in the LTE-A) configured for demodulation, and the estimated channel should be multiplied with the phase rotating precode to serve as the input channel of the detection algorithm.

For example, in the case in which data of two user equipments are transmitted by utilizing mentioned in the above example 1. FIG. 5A and FIG. 5B illustrates the phase rotation of the channel in the downlink transmission and uplink transmission.

During downlink transmission, the channel of the user equipment k (k=1,2) in three frequency-domain logical resource units is $[h_{k,1}, h_{k,2}, h_{k,3}]^T$, and the channel is subjected to phase rotation and is converted into multiple-layer logical channel for data detection, as illustrated in FIG. 5A.

During uplink transmission, the channel of user equipment 1 in three frequency-domain logical resource units is $[h_{1,1}, h_{1,2}, h_{1,3}]^T$, the channel of user equipment 2 in three frequency-domain logical units is $[h_{2,1}, h_{2,2}, h_{2,3}]^T$, and the channel is subjected to phase rotation and is converted into multiple-layer logical channel for data detection, as illustrated in FIG. 5B.

In order to ensure that the receiving device can update the estimated channel according to the modulation constellation rotation factor, one feasible manner is to respectively notify, by the high layer, the transmitting device and the receiving device of the modulation constellation rotation factor used during data transmission; the modulation constellation rotation factor can also be transmitted to the receiving device by the transmitting device; and an appointment can also be made between the transmitting device and the receiving device, with no need of notification from other devices.

When the transmit power needs to be adjusted in the transmission process, one feasible manner is to respectively notify, by the high layer, the transmitting device and the receiving device of the transmit power adjustment information used during data transmission; the transmit power adjustment information can also be transmitted to the receiving device by the transmitting device; and an appointment can also be made between the transmitting device and the receiving device, with no need of notification from other devices.

As shown in FIG. 6, the transmitting device in embodiment 6 of the invention includes a first adjustment module 600 and a first transmitting module 601.

The first adjustment module 600 is configured for adjusting each of multiple layers of data modulation symbols on each of multiple time-frequency resources modulated by an initial modulation constellation diagram according to the modulation constellation rotating factor corresponding to each of multiple layers of data modulation symbols on each time-frequency resource, wherein the multiple time-frequency resources are the multiple time-frequency resources onto which multiple layers of data are mapped according to the encoding matrix;

The first transmitting module 601 is configured for transmitting the multiple layers of adjusted data modulation symbols superposed on each of the time-frequency resources.

Optionally, the first adjustment module 600 is further configured for:

adjusting power of each layer of data modulation symbols on each of the time-frequency resources, and adjusting an amplitude of each layer of data modulation symbols on each of the time-frequency resources according to the power of each layer of data modulation symbols on each time-frequency resource.

Optionally, the first adjustment module 600 is further configured for determining the modulation constellation rotation factor by the following manner:

determining the number of data layers which need to pass through the same channel and which need to be subjected to modulation constellation rotation in each row according to the number of non-zero elements in the column elements corresponding to the data layers which need to pass through the same channel in each row of the encoding matrix; wherein each row of the encoding matrix corresponds to one mapped time-frequency resource, and each column corresponds to one data layer, when one column element in a row is non zero, it represents that the data modulation symbol of the data layer corresponding to the column is mapped onto the time-frequency resource corresponding to the row, and when one column element in a row is zero, it represents that no data modulation symbol of the data layer corresponding to the column is mapped onto the time-frequency resource corresponding to the row.

The first adjustment module 600 is specifically configured for:

determining a precoding factor according to the modulation constellation rotating factor of each of the data layers which need to pass through the same channel and which need to be subjected to modulation constellation rotation in each row, and performing a precoding process on each layer of data modulation symbols on each time-frequency resource according to the precoding factor.

Optionally, the first adjustment module 600 is specifically configured for determining the modulation constellation rotating factor of each of the data layers which need to pass through the same channel and which need to be subjected to modulation constellation rotation in each row according to the following formula:

$$\text{the modulation constellation rotating factor} = \exp\left\{j\frac{n\pi}{mN}\right\}.$$

Where exp{x} is an exponential function which takes a natural constant e as a radix; j is an imaginary unit; n=0, 1 ... N−1; N is the number of data layers which need to pass through the same channel and which need to be subjected to modulation constellation rotation; and m is a parameter related to the modulation constellation.

Optionally, the first transmitting module 601 is further configured for:

transmitting the modulation constellation rotating factor to the receiving end.

Optionally, the first transmitting module 601 is further configured for:

transmitting the adjustment information of transmit power to the receiving end.

Figure 7:
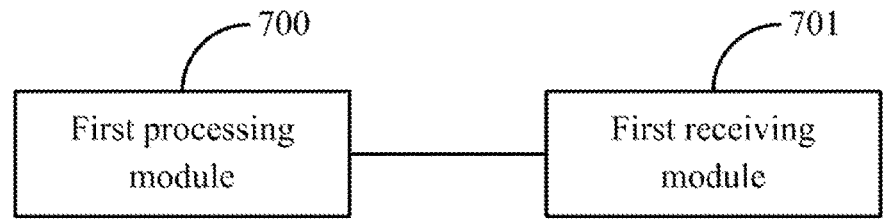
FIG. 7 is a schematic structural diagram of a receiving device in accordance with Embodiment 7 of the invention.

As shown in FIG. 7, the receiving device of embodiment 7 in the invention includes a first processing module 700 and a first receiving module 701.

The first processing module 700 is configured for updating an estimated channel on each of multiple time-frequency resources to obtain an updated channel according to a modulation constellation rotating factor corresponding to each layer of data modulation symbols on each time-frequency resource, wherein the modulation constellation rotating factor is a modulation constellation rotating factor which is adopted in the adjustment of a modulation constellation phase when the transmitting end transmits the data modulation symbols, and the time-frequency resources is the time-frequency resources onto which data are mapped according to an encoding matrix.

A first receiving module 701 is configured for detecting the received signal according to the updated channel, and detecting data of multiple layers of data streams from the received signal.

Optionally, the first processing module 700 is further configured for:

updating the estimated channel on each time-frequency resource according to the modulation constellation rotating factor and modulation symbol power information to obtain the updated channel, wherein the modulation symbol power information corresponds to a power adjusted by the transmitting end when the transmitting end transmits the data modulation symbols.

Figure 8:
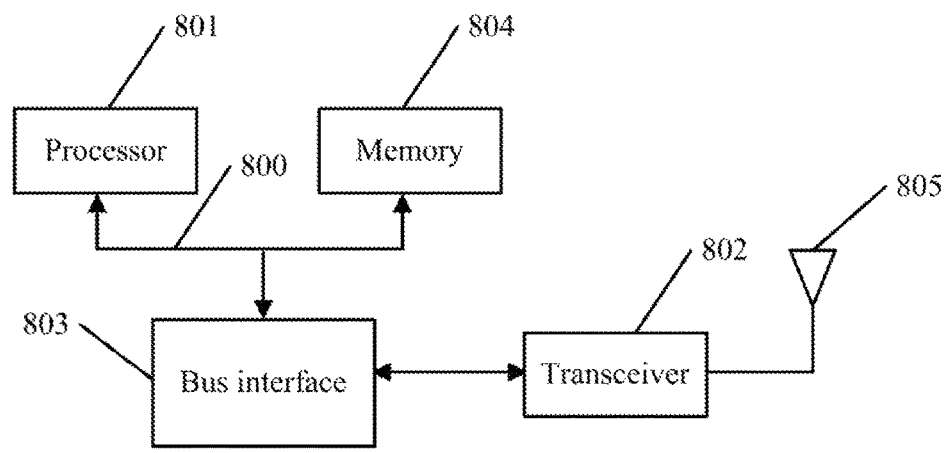
FIG. 8 is a schematic structural diagram of a transmitting device in accordance with Embodiment 8 of the invention.

As shown in FIG. 8, the transmitting device in embodiment 8 of the present invention includes:

a processor 801 configured for reading the programs in a memory 804 to perform:

adjusting each of a plurality of data modulation symbols on each of a plurality of time-frequency resources modulated by an initial modulation constellation diagram according to a modulation constellation rotating factor corresponding to each of the plurality of layers of data modulation symbols on each of the time-frequency resources, wherein the plurality of time-frequency resources are a plurality of time-frequency resources onto which data are mapped according to an encoding matrix; and transmitting the plurality of layers of adjusted data modulation symbols superposed on each of the time-frequency resources through a transceiver 802.

A transceiver 802 is configured for receiving and transmitting data under the control of a processor 801.

Optionally, the processor 801 is further configured for:

adjusting power of each of the plurality of layers of data modulation symbols on each of the time-frequency resources, and adjusting an amplitude of each of the plurality of layers of data modulation symbols on each of the time-frequency resources according to the power of each of the plurality of layers of data modulation symbols on each of the time-frequency resources.

Optionally, the processor 801 is further configured for determining the modulation constellation rotating factor based on the following manner.

Determining the number of data layers which need to pass through a same channel and which need to be subjected to modulation constellation rotation in each row according to the number of non-zero elements in column elements corresponding to the data layers which need to pass through the same channel in each row of the encoding matrix; wherein each row of the encoding matrix corresponds to one mapped time-frequency resource, and each column of the encoding matrix corresponds to one data layer, when one column element in a row is non zero, it represents that the data modulation symbol of the data layer corresponding to the column is mapped onto the time-frequency resource corresponding to the row, and when one column element in a row is zero, it represents that no data modulation symbol of the data layer corresponding to the column is mapped onto the time-frequency resource corresponding to the row.

The processor 801 is specifically configured for:

determining a precoding factor according to the modulation constellation rotating factor of each of the data layers which need to pass through the same channel and which need to be subjected to modulation constellation rotation in each row, and performing a precoding process on each of the plurality of layers of data modulation symbols on each of the time-frequency resources according to the precoding factor.

Optionally, the processor 801 is specifically configured for determining the modulation constellation rotating factor of each of the data layers which need to pass through the same channel and which need to be subjected to modulation constellation rotation in each row according to the following formula:

$$\text{the modulation constellation rotating factor} = \exp\left\{j\frac{n\pi}{mN}\right\}.$$

Where exp{x} is an exponential function which takes the natural constant e as a radix; j is an imaginary unit; n=0, 1 ... N−1; N is the number of data layers which need to pass through the same channel and which need to be subjected to modulation constellation rotation; and m is a parameter related to the modulation constellation.

Optionally, the processor 801 is further configured for:

transmitting the modulation constellation rotating factor to the receiving end through a transceiver 802.

Optionally, the processor 801 is further configured for:

transmitting the adjustment information of transmit power to the receiving end through a transceiver 802.

In FIG. 8, a bus architecture is represented by a bus 800, the bus 800 can include an arbitrary number of buses and bridges which are interconnected, the bus 800 connects various circuits of one or more processors represented by the processor 801 and memories represented by the memory 804. The bus 800 can also connect various other circuits such as peripheral equipment, voltage stabilizer and power administration circuit and the like, these are common knowledge of the art and are thus not further described herein in the text. The bus interface 803 provides an interface between the bus 800 and the transceiver 802. The transceiver 802 can be an element, or can also be multiple elements, such as multiple receivers and transmitters, and can be used for providing units to communicate with various other devices on the transmission medium. The data processed by the processor 801 is transmitted on the wireless medium via an antenna 805, and furthermore, the antenna 805 is also used for receiving data and transmitting the data to a processor 801.

The processor 801 is responsible for managing the bus 800 and ordinary treatment, and can also provide various functions including timing, peripheral interface, voltage regulation, power management and other control functions, while the memory 804 is configured for storing the data used by the processor 801 in performing operations.

Optionally, the processor 801 can be a CPU, an ASIC (Application Specific Integrated Circuit), an FPGA (Field—Programmable Gate Array) or a CPLD (Complex Programmable Logic Device).

Figure 9:
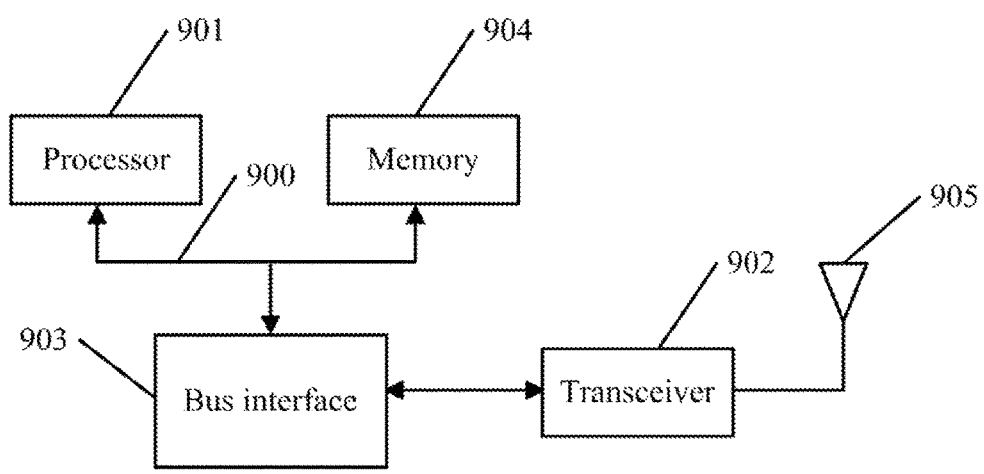
FIG. 9 is a schematic structural diagram of a receiving device in accordance with Embodiment 9 of the invention.

As shown in FIG. 9, the receiving device of Embodiment 9 of the invention includes:

a processor 901, configured for reading the programs in a memory 904 to perform:

on each of a plurality of time-frequency resources according to a modulation constellation rotating factor corresponding to each of a plurality of layers of data modulation symbols on each of the time-frequency resources to obtain an updated channel, wherein the modulation constellation rotating factor is a modulation constellation rotating factor which is adopted in adjustment of a modulation constellation phase when transmitting end transmits the data modulation symbols, and the time-frequency resources are time-frequency resources onto which data are mapped according to an encoding matrix; controlling a transceiver 902 to detect a received signal through the updated channel, and detecting data of a plurality of layers of data streams from the received signal.

The transceiver 902 is configured for receiving and transmitting data under the control of a processor 901.

Optionally, the processor 901 is configured for updating the estimated channel on each of the time-frequency resources according to the modulation constellation rotating factor and modulation symbol power information to obtain the updated channel, wherein the modulation symbol power information corresponds to a power adjusted by the transmitting end when the transmitting end transmits the data modulation symbols.

In FIG. 9, a bus architecture is represented by a bus 900, the bus 900 can include an arbitrary number of buses and bridges which are interconnected, the bus 900 connects various circuits of one or more processors represented by the processor 901 and memories represented by the memory 904. The bus 900 can also connect various other circuits such as peripheral equipment, voltage stabilizer and power administration circuit and the like, these are common knowledge of the art and are thus not further described herein in the text. The bus interface 903 provides an interface between the bus 900 and the transceiver 902. The transceiver 902 can be an element, or can also be multiple elements, such as multiple receivers and transmitters, and can be used for providing units to communicate with various other devices on the transmission medium. The data processed by the processor 901 is transmitted on the wireless medium via an antenna 905, and furthermore, the antenna 905 is also used for receiving data and transmitting the data to a processor 901.

The processor 901 is responsible for managing the bus 900 and ordinary treatment, and can also provide various functions including timing, peripheral interface, voltage regulation, power management and other control functions, while the memory 904 is configured for storing the data used by the processor 901 in performing operations.

Optionally, the processor 901 can be a CPU, an ASIC, an FPGA or a CPLD.

Based on the same inventive concept, the embodiments of the invention further provide a method for data transmission and a method for signal detection. Since the device corresponding to these methods is the device in the system of data transmission in FIG. 1 of the embodiments of the present invention, and the principle based on which these method solve problems is similar to that of the system, therefore, for the implementation of these methods, please refer to the implementation of the device in the system, and the implementation of these methods will not be repeated redundantly herein.

Figure 10:
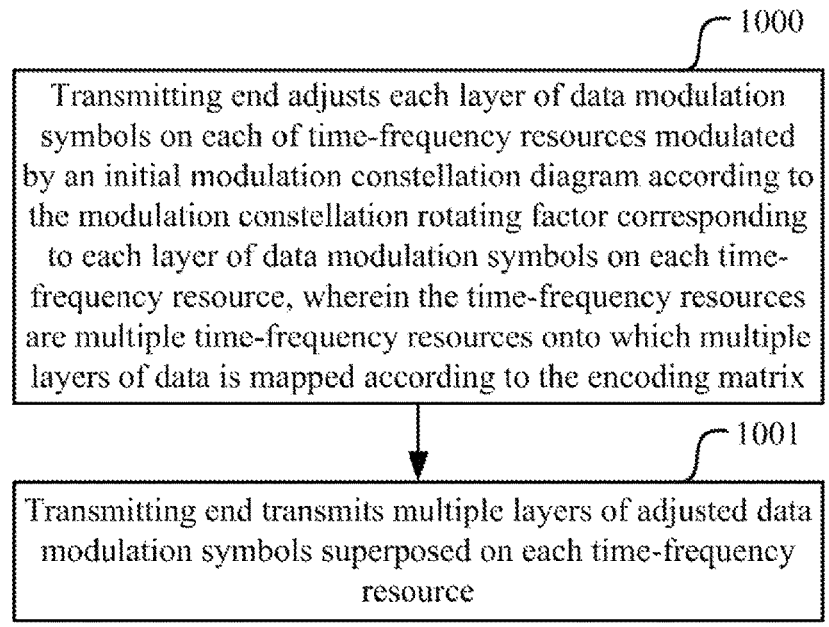
FIG. 10 is a schematic flow diagram of a method for transmitting data in accordance with Embodiment 10 of the invention.

As shown in FIG. 10, the method of data transmission in accordance with Embodiment 10 of the invention includes the following steps.

Step 1000, the transmitting end adjusts each of multiple layers of data modulation symbols on each of time-frequency resources modulated by an initial modulation constellation diagram, according to a modulation constellation rotating factor corresponding to each of layers of data modulation symbols on each time-frequency resource, wherein the time-frequency resources refer to the multiple time-frequency resources onto which data are mapped according to the encoding matrix.

Step 1001, the transmitting end transmits multiple layers of adjusted data modulation symbols superposed on each time-frequency resource.

Optionally, the method further includes:

the transmitting end adjusts the power of each layer of data modulation symbols on each time-frequency resource.

After the transmitting end adjusts each layer of modulation symbols on each time-frequency resource and before the transmitting end transmits multiple layers of adjusted data modulation symbols superposed on each time-frequency resource, the method further includes:

the transmitting end adjusts the amplitude of each layer of data modulation symbols on each time-frequency resource according to the power of each layer of data modulation symbols on each time-frequency resource.

Optionally, the transmitting end determines the modulation constellation rotation factor based on the following manner.

The transmitting end determines the number of data layers which need to pass through the same channel and which need to be subjected to modulation constellation rotation in each row according to the number of non-zero elements in column elements corresponding to the data layers which need to pass through the same channel in each row of an encoding matrix; wherein each row of the encoding matrix corresponds to one mapped time-frequency resource, and each column corresponds to one data layer, when one column element in a row is non zero, it represents that the data modulation symbol of the data layer corresponding to the column is mapped onto the time-frequency resource corresponding to the row, and when a column element in a row is zero, it represents that no data modulation symbol of the data layer corresponding to the column is mapped onto the time-frequency resource corresponding to the row.

The transmitting end determines the modulation constellation rotating factor of the data layers needing to be subjected to modulation constellation rotation according to the number of the data layers which need to pass through the same channel and which need to be subjected to modulation constellation rotation in each row.

The transmitting end adjusts each layer of data modulation symbols on each time-frequency resource according to the modulation constellation rotating factor corresponding to each layer of data modulation symbols in each row, includes the following steps.

The transmitting end determines a precoding factor according to the modulation constellation rotating factor of each of data layers which need pass through the same channel and which need to be subjected to modulation constellation rotation in each row, and performs a precoding process on each layer of data modulation symbols on each time-frequency resource according to the precoding factor.

Optionally, the transmitting end determines the modulation constellation rotating factor of each of data layers which need to pass through the same channel and which need to be subjected to modulation constellation rotation in each row based on the following formula:

$$\text{the modulation constellation rotating factor} = \exp\left\{j\frac{n\pi}{mN}\right\}.$$

Where exp{x} is an exponential function which takes the natural constant e as a radix; j is an imaginary unit; n=0, 1 ... N−1; N is the number of data layers which need to pass through the same channel and which need to be subjected to modulation constellation rotation; and m is a parameter related to the modulation constellation.

Optionally, after the transmitting end adjusts the modulation constellation phase of each layer of data modulation symbols on each time-frequency resource, the method further includes:

the transmitting end transmits the modulation constellation rotating factor to the receiving end.

Optionally, after the transmitting end adjusts the modulation constellation phase of each layer of data modulation symbols on each time-frequency resource, the method further includes:

the transmitting end transmits the adjustment information of transmit power to the receiving end.

Figure 11:
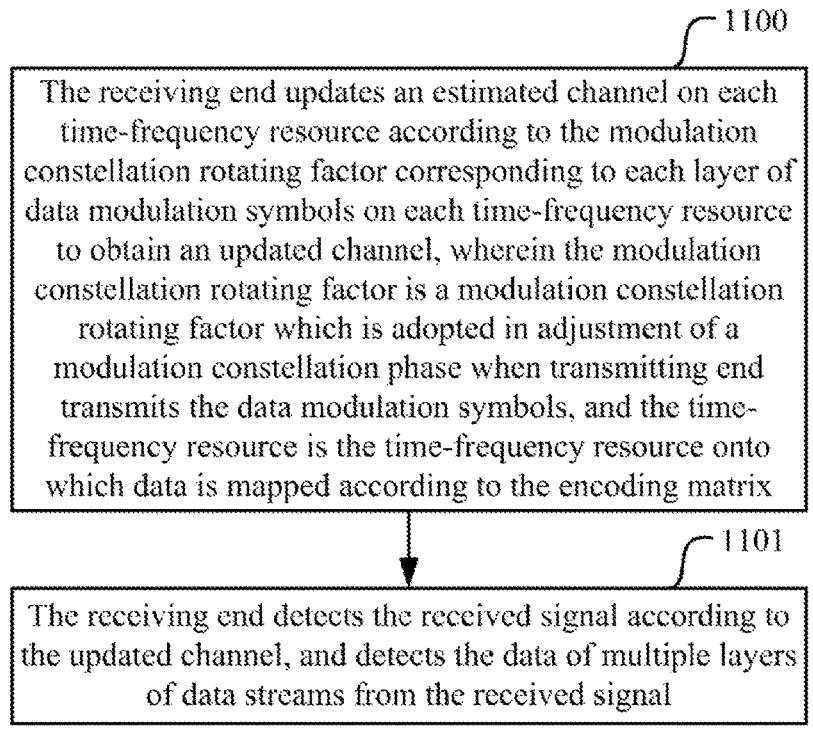
FIG. 11 is a schematic flow diagram of a method for receiving data in accordance with Embodiment 11 of the present invention.

As shown in FIG. 11, the method for signal detection in accordance with Embodiment 11 of the invention includes the following steps.

Step 1100, the receiving end updates an estimated channel on each time-frequency resource according to the modulation constellation rotating factor corresponding to each layer of data modulation symbols on each time-frequency resource to obtain an updated channel, wherein the modulation constellation rotating factor is a modulation constellation rotating factor which is adopted in the adjustment of a modulation constellation phase when the transmitting end transmits the data modulation symbols, and the time-frequency resource is the time-frequency onto which data are mapped according to the encoding matrix.

Step 1101, the receiving end detects the received signal through the updated channel, and detects the data of multiple layers of data streams from the received signal.

Optionally, the receiving end updates the estimated channel on each time-frequency resource according to the modulation constellation rotation factor corresponding to each layer of data modulation symbols on each time-frequency resource, further includes:

the receiving end updates the estimated channel on each time-frequency resource according to the modulation constellation rotating factor and the modulation symbol power information, to obtain an updated channel, wherein the modulation symbol power information corresponds to the power adjusted by the transmitting end when the transmitting end transmits the data modulation symbols.

From the above content, it can be seen that, in the embodiments of the present invention, each layer of data modulation symbols modulated by an initial modulation constellation diagram are adjusted based on the modulation constellation rotation factor corresponding to various layers of data modulation symbols, such that the modulation constellation diagrams corresponding to the various layers of data modulation symbols are non-overlapping, so as to avoid the condition that the receiving end cannot effectively detect signals due to the fact that corresponding modulation constellation diagrams are overlapping when the modulation symbols of multiple layers of data streams using the same modulation constellation and the same power in the encoding matrix of the PDMA reach the receiving end after passing through the same channel; and the system performance is further improved.

Those skilled in the art should understand that, the embodiments of the present invention can be provided as a method, a system or a computer program product. Therefore, the present invention can adopt the form of a complete hardware embodiment, a complete software embodiment, or an embodiment combining software and hardware. Moreover, the invention can adopt a form of computer program products which are implemented on one or more computer available storage media (including but not limited to a disk storage, a CD-ROM and an optical storage, etc.) which include computer available program codes.

The present invention is described in reference to the flow chart and/or block diagram based on the method, device (system) and computer program products in the embodiments of the present invention. It should be understood that, a computer program command can be utilized to realize each flow and/or block in a flow chart and/or a block diagram, and the combination of a flow and/or a block in the flow chart and/or a block diagram. These computer program commands can be provided to a general-purpose computer, a special-purpose computer, an embedded processor or the processors of other programmable data processing devices to form a machine, such that the commands implemented through a computer or processors of other programmable data processing devices can generate a device for realizing the functions designated in one or more flows in a flow chart and/or one or more blocks in a block diagram.

These computer program commands can also be stored in a computer readable memory which can guide a computer or other programmable data processing devices to operate in a specific manner, such that the commands stored in the computer readable memory can generate a manufactured product including a command device, and the command device realizes the functions designated in one or more flows in a flow chart and/or in one or more blocks in a block diagram.

These computer program commands can also be loaded onto a computer or other programmable data processing devices, such that a series of operational steps can be implemented on the computer or other programmable devices to produce the treatment realized by a computer, therefore, the commands implemented on a computer or other programmable devices provide steps for realizing the functions designated in one or more flows in a flow chart and/or in one or more blocks in a block diagram.

Although the preferred embodiments of the present invention have been described, once those skilled in the art know the basic inventive concept, they may make additional alterations and modifications. Therefore, the attached claims intend to be explained as including the preferred embodiments and all the alterations and modifications falling within the scope of the present invention.

Apparently, those skilled in the art can make various modifications and deformations to the present invention, without departing from the spirit and scope of the present invention. Hence, if these modifications and deformations of the present invention fall within the scope of the claims of the present invention and their equivalent technologies, the present invention also has the intention of including these modifications and deformations.

The invention claimed is:

1. A data transmission method, comprising:
adjusting, by a transmitting end, each of a plurality of layers of data modulation symbols on each of a plurality of time-frequency resources modulated by an initial modulation constellation diagram, according to a modulation constellation rotating factor corresponding to each of the plurality of layers of data modulation symbols on each of the time-frequency resources, wherein the plurality of time-frequency resources are a plurality of time-frequency resources onto which data are mapped according to an encoding matrix; and
transmitting, by the transmitting end, the plurality of layers of adjusted data modulation symbols superposed on each of time-frequency resources;
wherein the transmitting end determines the modulation constellation rotating factor by the following manner:
the transmitting end determines the number of data layers which need to pass through a same channel and which need to be subjected to modulation constellation rotation in each row according to the number of non-zero elements in column elements, corresponding to data layers which need to pass through the same channel, in each row of the encoding matrix; wherein each row of the encoding matrix corresponds to one mapped time-frequency resource, and each column of the encoding matrix corresponds to one data layer, when one column element in a row is non zero, it represents that the data modulation symbol of the data layer corresponding to the column is mapped onto the time-frequency resource corresponding to the row, and when one column element in a row is zero, it represents that no data modulation symbol of the data layer corresponding to the column is mapped onto the time-frequency resource corresponding to the row;
the transmitting end determines the modulation constellation rotating factor of each of the data layers needing to be subjected to modulation constellation rotation according to the number of the data layers which need to pass through the same channel and which need to be subjected to modulation constellation rotation in each row; and
adjusting, by the transmitting end, each of the plurality of layers of data modulation symbols on each of time-frequency resources, according to the modulation constellation rotating factor corresponding to each of the plurality of layers of data modulation symbols in each row, comprises:
the transmitting end determines a precoding factor according to the modulation constellation rotating factor of each of the data layers which need to pass through the same channel and which need to be subjected to modulation constellation rotation in each row, and performs a precoding process on each of the plurality of layers of data modulation symbols on each of the time-frequency resources according to the precoding factor.

2. The method of claim 1, further comprising:
adjusting, by the transmitting end, power of each of the plurality of layers of data modulation symbols on each of the time-frequency resources; and
after the transmitting end adjusts each of the plurality of layers of modulation symbols on each of time-frequency resources and before the transmitting end transmits the plurality of layers of adjusted data modulation symbols superposed on each of time-frequency resources, the method further comprises:
adjusting, by the transmitting end, an amplitude of each of the plurality of layers of data modulation symbols on each of the time-frequency resources, according to the power of each of the plurality of layers of data modulation symbols on each of the time-frequency resources.

3. The method of claim 1, wherein the transmitting end determines the modulation constellation rotating factor of each of the data layers which need to pass through the same channel and which need to be subjected to modulation constellation rotation in each row according to the following formula:

$$\text{the modulation constellation rotating factor} = \exp\left\{j\frac{n\pi}{mN}\right\};$$

wherein exp{x} is an exponential function which takes a natural constant e as a radix; j is an imaginary unit; n=0, 1 . . . N−1; N is the number of data layers which need to pass through the same channel and which need to be subjected to modulation constellation rotation; and m is a parameter related to the modulation constellation.

4. The method of claim 1, wherein after the transmitting end adjusts a modulation constellation phase of each of the plurality of layers of data modulation symbols on each of the time-frequency resources, the method further comprises:
the transmitting end transmits the modulation constellation rotating factor to a receiving end.

5. The method of claim 2, wherein after the transmitting end adjusts a modulation constellation phase of each of the plurality of layers of data modulation symbols on each of the time-frequency resources, the method further comprises:
the transmitting end transmits adjustment information of transmit power to a receiving end.

6. A transmitting device for data transmission, comprising:
a processor, configured for adjusting each of a plurality of data modulation symbols on each of a plurality of time-frequency resources modulated by an initial modulation constellation diagram according to a modulation constellation rotating factor corresponding to each of the plurality of layers of data modulation symbols on each of the time-frequency resources, wherein the plurality of time-frequency resources are a plurality of time-frequency resources onto which data are mapped according to an encoding matrix; and
a transceiver, configured for transmitting the plurality of layers of adjusted data modulation symbols superposed on each of the time-frequency resources;
wherein the processor is further configured for determining the modulation constellation rotating factor by the following manner:
determining the number of data layers which need to pass through a same channel and which need to be subjected to modulation constellation rotation in each row according to the number of non-zero elements in the column elements corresponding to the data layers which need to pass through the same channel in each row of the encoding matrix; wherein each row of the encoding matrix corresponds to one mapped time-frequency resource, and each column of the encoding matrix corresponds to one data layer, when one column element in a row is non zero, it represents that the data modulation symbol of the data layer corresponding to the column is mapped onto the time-frequency resource corresponding to the row, and when one column element in a row is zero, it represents that no data modulation symbol of the data layer corresponding to the column is mapped onto the time-frequency resource corresponding to the row;

the processor is configured for:
determining a precoding factor according to the modulation constellation rotating factor of each of the data layers which need to pass through the same channel and which need to be subjected to modulation constellation rotation in each row, and performing a precoding process on each of the plurality of layers of data modulation symbols on each of the time-frequency resources according to the precoding factor.

7. The transmitting device of claim 6, wherein the processor is further configured for:
adjusting power of each of the plurality of layers of data modulation symbols on each of the time-frequency resources, and adjusting an amplitude of each of the plurality of layers of data modulation symbols on each of the time-frequency resources according to the power of each of the plurality of layers of data modulation symbols on each of the time-frequency resources.

8. The transmitting device of claim 6, wherein the processor is configured for determining the modulation constellation rotating factor of each of the data layers which need to pass through the same channel and which need to be subjected to modulation constellation rotation in each row according to the following formula:

$$\text{the modulation constellation rotating factor} = \exp\left\{j\frac{n\pi}{mN}\right\};$$

wherein exp{x} is an exponential function which takes a natural constant e as a radix; j is an imaginary unit; n=0, 1 ... N−1; N is the number of data layers which need to pass through the same channel and which need to be subjected to modulation constellation rotation; and m is a parameter related to the modulation constellation.

9. The transmitting device of claim 6, wherein the transceiver is further configured for:
transmitting the modulation constellation rotating factor to a receiving end.

10. The transmitting device of claim 7, wherein the transceiver is further configured for:
transmitting adjustment information of transmit power to a receiving end.

11. The method of claim 2, wherein after the transmitting end adjusts a modulation constellation phase of each of the plurality of layers of data modulation symbols on each of the time-frequency resources, the method further comprises:
the transmitting end transmits the modulation constellation rotating factor to a receiving end.

12. The method of claim 3, wherein after the transmitting end adjusts a modulation constellation phase of each of the plurality of layers of data modulation symbols on each of the time-frequency resources, the method further comprises:
the transmitting end transmits the modulation constellation rotating factor to a receiving end.

13. The transmitting device of claim 7, wherein the transceiver is further configured for:
transmitting the modulation constellation rotating factor to a receiving end.

* * * * *